US011951562B2

(12) United States Patent
Kobayashi et al.

(10) Patent No.: US 11,951,562 B2
(45) Date of Patent: Apr. 9, 2024

(54) LASER PROCESSING SYSTEM

(71) Applicant: THE UNIVERSITY OF TOKYO, Tokyo (JP)

(72) Inventors: Yohei Kobayashi, Tokyo (JP); Shuntaro Tani, Tokyo (JP); Yutsuki Aoyagi, Tokyo (JP)

(73) Assignee: THE UNIVERSITY OF TOKYO, Tokyo (JP)

( * ) Notice: Subject to any disclaimer, the term of this patent is extended or adjusted under 35 U.S.C. 154(b) by 577 days.

(21) Appl. No.: 16/283,130

(22) Filed: Feb. 22, 2019

(65) Prior Publication Data

US 2019/0262936 A1    Aug. 29, 2019

(30) Foreign Application Priority Data

Feb. 23, 2018  (JP) ................................ 2018-030874

(51) Int. Cl.
*B23K 26/03* (2006.01)
*B23K 26/0622* (2014.01)
(Continued)

(52) U.S. Cl.
CPC ........ *B23K 26/032* (2013.01); *B23K 26/0624* (2015.10); *B23K 26/064* (2015.10);
(Continued)

(58) Field of Classification Search
CPC .......................... B23K 26/032; B23K 26/0624; B23K 26/064; B23K 26/705; B23K 26/36; B23K 26/362; B23K 26/03; B23K 26/21; B23K 26/38; B23K 26/70; B23K 37/00; B23K 26/702; B23K 26/707; B23K 37/006; B23K 26/0626; B23K 26/60; B23K 26/40; B23K 26/359; B23K 31/006; B23K 26/046; B23K 26/042; B23K 26/048; B23K 26/02; B23K 26/50; B23K 26/142; B23K 26/073; B23K 26/53; B23K 26/126; B23K 26/1462; B23K 26/0622; B23K 26/123; B23K 26/354;
(Continued)

(56) References Cited

U.S. PATENT DOCUMENTS 5,281,798 A * 1/1994 Hamm ............... G01N 21/8422
                                                        250/226
9,018,562 B2 * 4/2015 Dantus ................. B23K 26/382
                                                        219/121.76
(Continued)

FOREIGN PATENT DOCUMENTS

JP        2017-131937 A    8/2017

*Primary Examiner* — Dana Ross
*Assistant Examiner* — Adam M Eckardt
(74) *Attorney, Agent, or Firm* — Oliff PLC

(57) ABSTRACT

A laser processing system is equipped with a processing laser beam irradiation device configured to irradiate a processing object with processing laser beam and perform ablation processing. The laser processing system is configured to obtain an ablation image of a processed portion of the processing object based on scattered light from the processed portion during processing of the processing object with the processing laser beam and to estimate an ablation volume by applying a learning result obtained by deep learning of a relationship between the ablation image and the ablation volume to the obtained ablation image.

7 Claims, 6 Drawing Sheets

(51) Int. Cl.
*B23K 26/064* (2014.01)
*B23K 26/36* (2014.01)
*B23K 26/362* (2014.01)
*B23K 26/70* (2014.01)
*G06N 3/08* (2023.01)

(52) U.S. Cl.
CPC ............ B23K 26/36 (2013.01); B23K 26/362 (2013.01); B23K 26/705 (2015.10); G06N 3/08 (2013.01)

(58) Field of Classification Search
CPC .... B23K 26/18; B23K 26/352; B23K 26/127; B23K 31/125; B23K 37/0408; B23K 37/0235; B23K 26/062; B23K 26/04; B23K 26/402; B23K 26/0608; B23K 26/32; B23K 26/14; B23K 26/128; B23K 26/16; B23K 26/57; B23K 26/0617; B23K 26/10; B23K 26/0604; G06N 3/08; G06N 20/00; G06N 20/10; G06N 3/0454; G06N 3/006; H01S 5/00; H01S 3/10; H01S 5/0021; H01S 3/10069; H01S 3/0071; H01S 3/2232; H01S 3/2251; H01S 3/134; H01S 3/2375; H01S 3/11; H01S 3/10061; H01S 3/225; H01S 3/2308; H01S 3/1317; H01S 5/06825; H01S 3/1305; H01S 3/06754; H01S 3/0014; H01S 5/06804; H01S 3/094076; H01S 3/1024; H01S 3/1055; H01S 3/0092; H01S 3/13; H04L 29/08; H04L 67/10; G06F 30/00; G06F 30/20; G06F 3/017; G09B 19/24; G05B 19/4155; G05B 19/4065; G05B 15/02; G05B 19/182; G05B 13/042; G05B 13/0265; G05B 19/4099; G05B 13/027; G05B 19/19; G05B 19/4097; G02B 27/0983; G02B 17/0663; G02B 27/30; G02B 27/0955; G02B 19/0019; G02B 19/0047; G02B 27/646; G02B 5/001; G02B 26/0816; G02B 27/0927; G02B 6/26; G02B 6/02; G02B 21/361; G03F 7/70033; G03F 7/2006; G03F 7/70291; G03F 7/2008; G03F 7/70508; G03F 7/70041; G03F 7/70091; G03F 7/70725; G03F 7/70325; G03F 9/7026; G03F 7/70025; G03F 7/70333; H05G 2/008; H05G 2/003; H05G 2/006; G01J 1/4257; G01J 3/0218; G01J 3/443; G01J 3/10; H01L 21/0275; H01L 21/027; H01L 21/223; H01L 21/0455; H01L 21/67092; H01L 21/67115; H01L 21/268; H01L 21/78; H01L 41/338; H01L 21/02678; H01L 21/02691; A61B 5/14542; A61B 5/0095; A61B 5/444; A61B 5/7267; A61B 5/0075; A61B 5/7246; A61B 8/13; A61B 5/14551; A61B 5/02416; A61B 5/14546; A61B 5/1455; A61B 5/0066; A61B 5/4312; A61B 18/24; H05H 1/24; H05H 15/00; G01B 11/24; G01B 11/14; G01B 11/026; G01B 11/22; G06V 20/64; G06V 40/28; G01S 17/89; G21F 9/30; G21F 9/28; G21F 9/005; C03B 33/0222; C03B 33/091; B28D 5/0011; C03C 23/0025; G06T 7/0004; G06T 7/001; B63B 25/16; F17C 6/00; F17C 9/04; F17C 9/02; F02M 21/0215; B63J 2/14; G02F 1/0121; G08B 21/182; H03K 7/08; H01J 37/285; H01J 37/244; H01J 37/045; H01J 49/0004; H01M 8/1069; H01M 50/40; B25J 9/1671
See application file for complete search history.

(56) References Cited

U.S. PATENT DOCUMENTS

| | | | |
|---|---|---|---|
| 2016/0193790 A1* | 7/2016 | Shuck | B22F 10/30 700/119 |
| 2017/0120377 A1* | 5/2017 | Webster | B22F 10/64 |
| 2017/0220927 A1 | 8/2017 | Takigawa et al. | |
| 2017/0270434 A1* | 9/2017 | Takigawa | B23K 26/38 |

* cited by examiner

LASER PROCESSING SYSTEM

CROSS-REFERENCE TO RELATED APPLICATIONS

The present disclosure claims priority to Japanese Patent Application No. 2018-030874 filed Feb. 23, 2018, which is incorporated herein by reference in its entirety including specification, drawings and claims.

TECHNICAL FIELD

The present disclosure relates to a laser processing system and more specifically a laser processing system equipped with a processing laser beam irradiation device configured to irradiate a processing object with processing laser beam and thereby perform ablation processing.

BACKGROUND

A proposed laser processing system is provided with a machine learning device including a quantity of state observer configured to observe a quantity of state of a laser device that includes output data of a reflected light detector configured to measure a quantity of reflected light; an operation result obtainer configured to obtain a success/failure result with regard to a start of processing with laser beam output from a laser oscillator; a learner configured to receive outputs from the quantity of state observer and the operation result obtainer and learn light output command data in relation to the quantity of state of the laser device and the success/failure result with regard to the start of processing; and a decision maker configured to refer to the light output command data learned by the learner and determine the light output command data as described in, for example, JP 2017-131937A). This system learns the light output command data used to start processing of a processing object within a predetermined time period, while satisfying a condition that the quantity of reflected light does not become higher than a second predetermined level that is set higher than a first predetermined level.

CITATION LIST

PLT1: JP2017-131937A

SUMMARY

With regard to the laser processing system, there is a demand for successively checking the degree of progress of ablation processing of a processed portion by laser irradiation and using the degree of progress for control of laser irradiation. The degree of progress of ablation processing may be indicated, for example, by the ablation volume or the depth of the processed portion. Measurement of the ablation volume, however, needs to take an image of the processed portion by a three-dimensional laser microscope or a white light interference microscope and calculate the ablation volume and thereby requires a time period of approximately 10 seconds. There is accordingly a need to discontinue laser processing. It is impossible to take an image of the processed portion during laser processing. This method is accordingly unsuitable for control of laser irradiation.

A main object of the laser processing system of the present disclosure is to determine an ablation volume in an extremely short time during ablation processing by laser irradiation.

In order to achieve the above primary object, the laser processing system of the present disclosure employs the following configuration.

The present disclosure is directed to a laser processing system equipped with a processing laser beam irradiation device configured to irradiate a processing object with processing laser beam and perform ablation processing. The laser processing system includes a processed portion image obtainer configured to obtain an ablation image of a processed portion of the processing object based on scattered light from the processed portion during processing of the processing object with the processing laser beam and an ablation volume estimator configured to estimate an ablation volume by applying a learning result obtained by deep learning of a relationship between the ablation image and the ablation volume to the ablation image obtained by the processed portion image obtainer.

The laser processing system according to this aspect of the present disclosure obtains the ablation image of the processed portion of the processing object based on scattered light from the processed portion during processing of the processing object with the processing laser beam, and applies the learning result obtained by deep learning that learns the relationship between the ablation image and the ablation volume, to the obtained ablation image, so as to estimate the ablation volume. The ablation image herein denotes an image obtained by imaging the scattered light from the irregularities on the surface of the processed portion. A high-speed camera may be employed as the processed portion image obtainer to take an image of the scattered light and thereby obtain the ablation image. This configuration requires an extremely short time period for obtaining the ablation image. The ablation volume is estimated by applying the learning result obtained by deep learning of the relationship between the ablation image and the ablation volume, to the obtained ablation image. This configuration also requires an extremely short time period for estimating the ablation volume. As a result, this configuration enables the ablation volume to be determined in an extremely short time. The ablation image is the image obtained by imaging the scattered light from the irregularities on the surface of the processed portion that is subjected to ablation processing. The ablation volume has a correlation to the irregularities on the surface of the processed portion and may thus be replaced by the geometry of the entire processed portion. Estimating the ablation volume from the ablation image accordingly means estimating the geometry of the entire processed portion from the ablation image. The configuration that estimates the geometry of the entire processed portion during laser processing and uses the estimated geometry for control of subsequent processing, i.e., control of the processing laser beam output from the processing laser beam irradiation device (for example, setting of the intensity and the pulse width of the processing laser beam) ensures the more appropriate laser processing. The correlation between the ablation image (image obtained by imaging the scattered light from the irregularities on the surface of the processed portion) and the ablation volume has been confirmed experimentally as a correlation between an integrated value of a pattern change rate on the surface of the processed portion and the ablation volume. The pattern change rate is defined as "a root mean square of a difference in brightness between two ablation images taken before and after radiation of pulse laser beam relative to an average of brightness of the two ablation images [(root mean square of difference in brightness between two images)/(average of brightness of two images)]".

In the laser processing system of this aspect, the deep learning may be learning that uses a plurality of consecutive ablation images as input data in laser processing. This configuration provides the learning result of the higher accuracy to be used.

In the laser processing system of this aspect, the deep learning may use a processing parameter including a parameter that has a correlation to the ablation volume or a parameter that is measurable in the ablation processing, to learn a relationship between the ablation image and the processing parameter, and apply the correlation to the relationship between the ablation image and the processing parameter obtained by learning, so as to specify the relationship between the ablation image and the ablation volume as the learning result. This configuration provides the learning result of the higher accuracy or enables the learning result to be obtained more readily, compared with a configuration that directly learns the relationship between the ablation image and the ablation volume. The processing parameter is a parameter relating to the total energy of the processing laser beam which the processed portion is irradiated with since a start of the processing and is, for example, the light intensity of the processing laser beam and the frequency of irradiation, the light intensity of the processing laser beam and sweep rate of the processing object, the fluence of the processing laser beam and the sweep rate of the processing object, the plasma emission intensity, or the sound pressure.

The laser processing system of this aspect may further include an imaging laser beam irradiation device configured to irradiate the processed portion with imaging laser beam that has a wavelength different from a wavelength of the processing laser beam, so as to obtain the ablation image. This configuration enables a desired wavelength laser beam to be used as the imaging laser beam.

In the laser processing system of this aspect, the processed portion image obtainer may obtain the ablation image at every predetermined time interval. This configuration enables the ablation volume by the ablation processing to be determined at every predetermined time interval and enables the processing laser beam irradiation device to control the processing laser beam more appropriately at every predetermined time interval. In this case, the processing laser beam irradiation device may be configured to output pulse laser beam having a pulse width of femtosecond order as the processing laser beam and perform ablation processing, the processed portion image obtainer may be configured to obtain the ablation image at every time of radiation of each pulse laser beam or a plurality of pulse laser beams, and the ablation volume estimator may be configured to estimate the ablation volume prior to radiation of next processing laser beam by the processing laser beam irradiation device. This configuration enables the ablation volume to be determined at every time of radiation of each pulse laser beam or a plurality of pulse laser beams and enables the processing laser beam irradiation device to control the processing laser beam more appropriately at every time of radiation of each pulse laser beam or a plurality of pulse laser beams.

DESCRIPTION OF EMBODIMENTS

The following describes some aspects of the disclosure with reference to embodiments.

Figure 1:
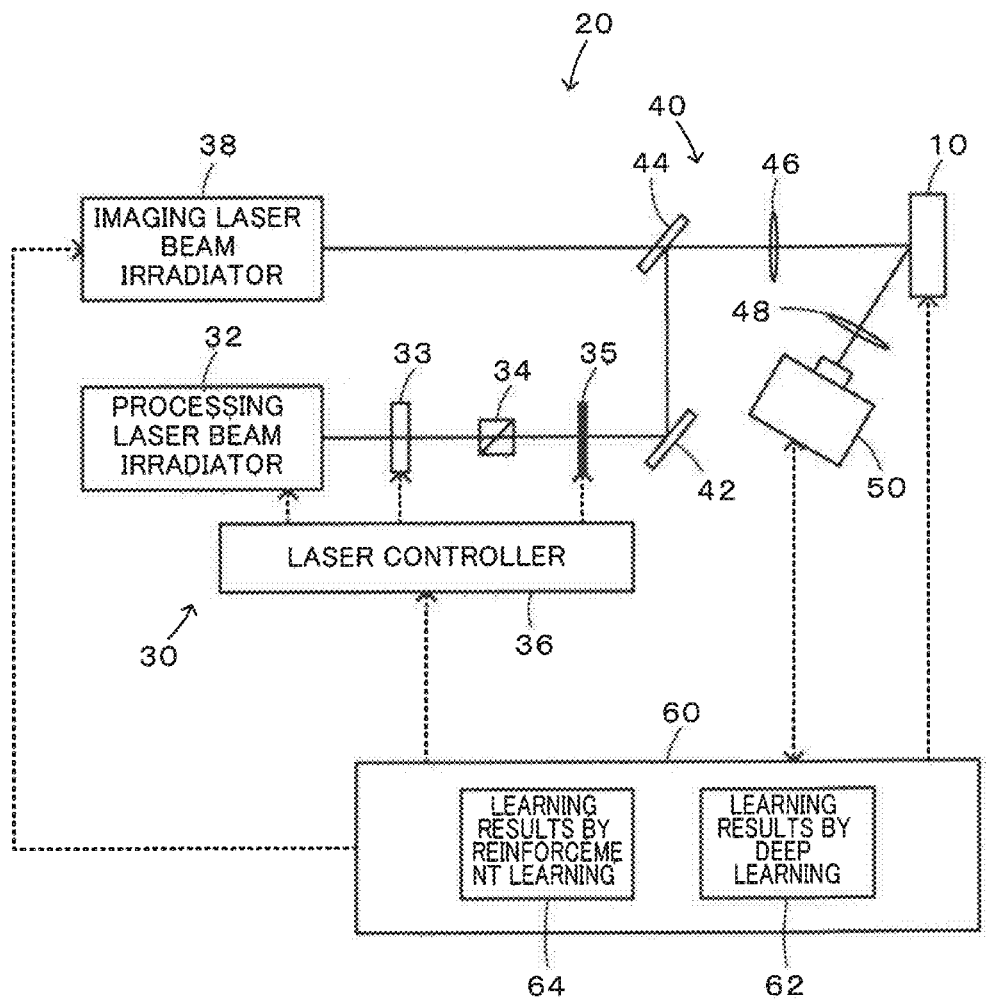
FIG. 1 is a configuration diagram illustrating the schematic configuration of a laser processing system according to one embodiment of the present disclosure.

FIG. 1 is a configuration diagram illustrating the schematic configuration of a laser processing system 20 according to one embodiment of the present disclosure. As illustrated, the laser processing system 20 of the embodiment includes a processing laser beam irradiation device 30 configured to output processing laser beam; an imaging laser beam irradiator 38 configured to output imaging laser beam having a different wavelength from the wavelength of the processing laser beam; an optical system 40 configured to guide the processing laser beam and the imaging laser beam to a processed portion of a processing object 10 and to guide scattered light by irradiation of the processing object 10 with the imaging laser beam to a high-speed camera 50; the high-speed camera 50 configured to take a concavo-convex image (ablation image) on the surface of the processed portion based on the scattered light by irradiation of the processing object 10 with the imaging laser beam; and a system control device 60 configured to control the entire laser processing system 20.

The processing laser beam irradiation device 30 includes a processing laser beam irradiator 32 configured to output the processing laser beam; a half-wave plate 33 configured to adjust a polarizing direction of the processing laser beam; a polarizing beam splitter 34 configured to reflect S polarized light and to transmit P polarized light of the processing laser beam; a shutter 35 configured to be opened on a start of laser processing and to be closed on termination of laser processing; and a laser controller 36 configured to control the processing laser beam irradiator 32, the half-wave plate 33 and the shutter 35. The processing laser beam irradiator 32 is configured as, for example, a titanium sapphire laser irradiator to output processing laser beam (pulse laser beam) having a wavelength of 800 nm, a pulse width of 35 fs, a repetition frequency of 1 KHz and a fluence (pulse energy per unit area) of 0.1 to 1.0 J/cm$^2$. The laser controller 36 is configured as a CPU-based microcomputer to control the fluence of the processing laser beam irradiator 32, the polarizing direction of the half-wave plate 33 and the open/close timing of the shutter 35, in response to control signals from the system control device 60.

The imaging laser beam irradiator 38 is configured as, for example, a laser irradiator to output imaging laser beam having a wavelength of 633 nm and a pulse width of 500 μm.

The high-speed camera 50 is configured as, for example, a highly sensitive CMOS camera to take images at a repetition frequency of 1 kHz.

The optical system 40 includes a mirror 42 configured to guide the processing laser beam from the processing laser beam irradiation device 30; a half mirror 44 configured to reflect the processing laser beam from the mirror 42 and guide the reflected processing laser beam to the processing object 10 and to transmit the imaging laser beam from the imaging laser beam irradiator 38 and guide the transmitted imaging laser beam to the processing object 10; a lens 46 configured to focus the processing laser beam and the imaging laser beam onto the processed portion of the processing object 10; and a lens 48 configured to concentrate the scattered light by irradiation of the processing object 10 with the imaging laser beam.

The system control device 60 is configured as a CPU-based microcomputer and includes a ROM, a RAM, a flash memory, a GPU (graphics processing unit), input and output ports and the like in addition to a CPU, although not being illustrated. The system control device 60 is configured to store learning results 62 of a relationship between ablation image and ablation volume obtained by deep learning and learning results 64 of optimum irradiation of processing laser beam relative to the ablation volume obtained by reinforcement learning. The system control device 60 receives ablation images taken by the high-speed camera 50 via the input port. The system control device 60 outputs, via the output port, for example, a control signal to the imaging laser beam irradiator 38, a control signal to the laser controller 36 of the processing laser beam irradiation device 30, a control signal to the high-speed camera 50, and a driving signal to a stage (not shown) provided to move the processing object 10 mounted thereon in three directions (X, Y and Z directions).

In the laser processing system 20 of the embodiment, in response to a control signal from the system control device 60, processing laser beam (pulse laser beam) having a wavelength of 800 nm, a pulse width of 35 fs, a repetition frequency of 1 KHz and a fluence (pulse energy per unit area) of 0.1 to 1.0 $J/cm^2$ is output from the processing laser beam irradiator 32. The processing laser beam is reflected by the mirror 42 and the half mirror 44 via the half-wave plate 33, the polarizing beam splitter 34 and the shutter 35 and is focused by the lens 46 such that the processed portion of the processing object 10 is irradiated with the processing laser beam. In response to a control signal from the system control device 60, imaging laser beam having a wavelength of 633 nm, a pulse width of 500 μs and a repetition frequency of 1 kHz is, on the other hand, output from the imaging laser beam irradiator 38 at an output timing slightly later than the output timing of the processing laser beam. The imaging laser beam is transmitted through the half mirror 44 and is focused by the lens 46 such that the processed portion of the processing object 10 is irradiated with the imaging laser beam. The imaging laser beam is output slightly later than the processing laser beam. The processed portion of the processing object 10 is accordingly irradiated with the imaging laser beam immediately after an ablation processing performed by irradiation of the processed portion of the processing object 10 with the processing laser beam. In response to a control signal from the system control device 60, the high-speed camera 50 is controlled to image the scattered light by irradiation of the processed portion of the processing object 10 with the imaging laser beam. Accordingly, the high-speed camera 50 takes an image reflecting the irregularities on the surface of the processed portion based on the scattered light (ablation image) immediately after the ablation processing and outputs the taken ablation image to the system control device 60. When the ablation image taken by the high-speed camera 50 is input into the system control device 60, the system control device 60 applies the input ablation image into the learning results 62 by deep learning to determine an ablation volume. The system control device 60 subsequently applies the determined ablation volume to the learning results 64 by reinforcement learning to determine an optimum value of the processing laser beam that is to be radiated next and outputs the optimum value of the processing laser beam to the laser controller 36 of the processing laser beam irradiation device 30. The system control device 60 accordingly optimizes laser processing of the processing object 10 by the processing laser beam irradiation device 30.

The following describes the learning results 62 by deep learning used according to the embodiment. The learning results 64 by reinforcement learning are not characteristic of the present disclosure and are thereby not described further in detail.

Figure 2:
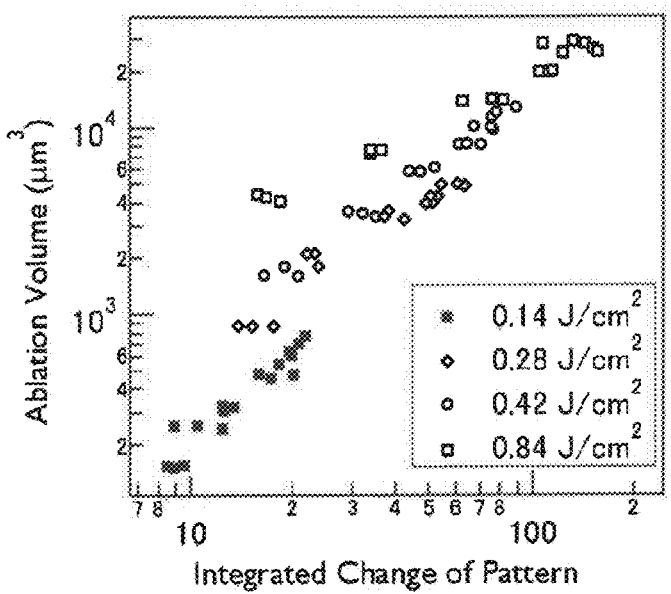
FIG. 2 is a diagram illustrating one example of a relationship between an integrated value of a pattern change rate on the surface of a processed portion and an ablation volume with regard to different fluences.
Figure 3:
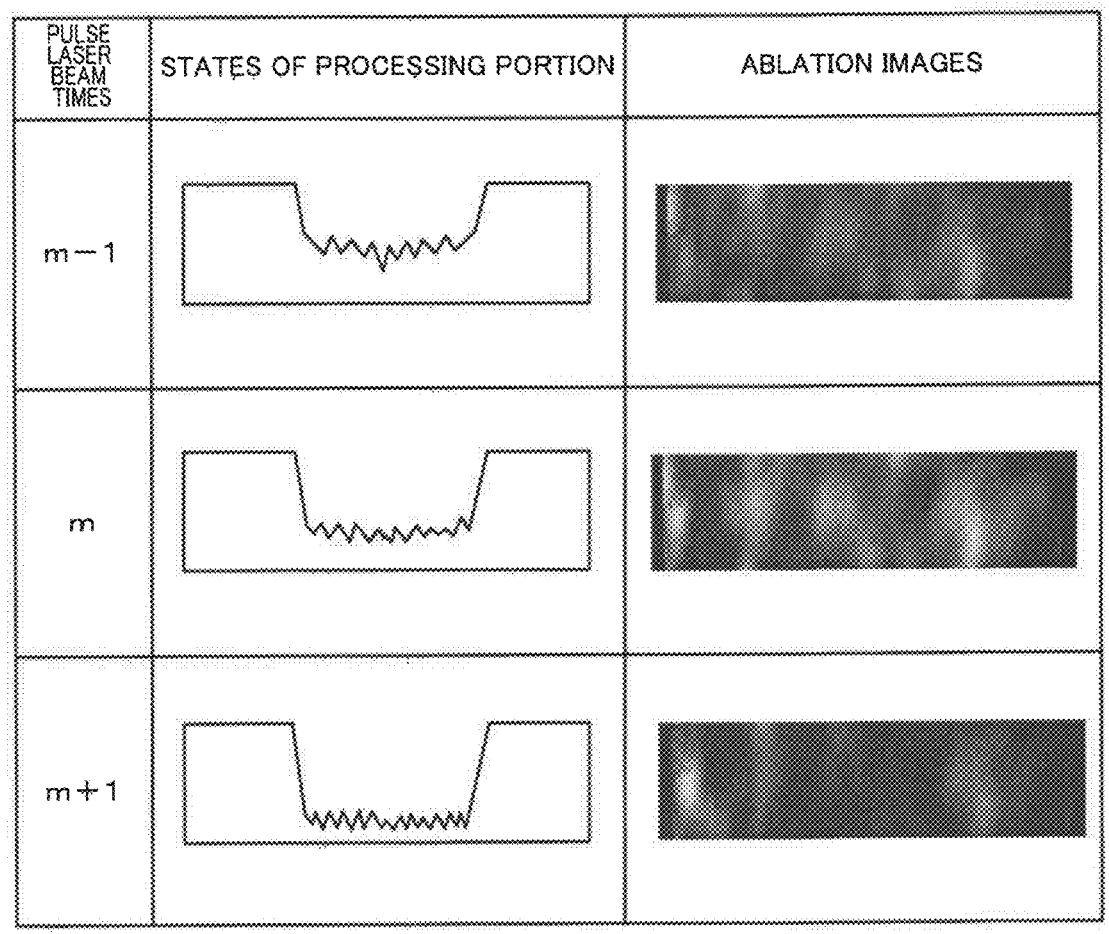
FIG. 3 is a diagram illustrating one example of the states of a processed portion of a processing object and ablation images in the case of irradiation of the processed portion with pulse laser beam (m−1) times, m times and (m+1) times.

FIG. 2 is a diagram illustrating one example of a relationship between an integrated value of a pattern change rate on the surface of the processed portion and the ablation volume with regard to different fluences. According to the embodiment, the pattern change rate is defined as a root mean square of a difference in brightness between two ablation images taken before and after radiation of pulse laser beam relative to an average of brightness of the two ablation images [(root mean square of difference in brightness between two images)/(average of brightness of two images)]. As illustrated, the integrated value of the pattern change rate on the surface of the processed portion has a correlation to the ablation volume. Different fluences, however, have different correlations. The integrated value of the pattern change rate on the surface of the processed portion is reflected in the ablation image, because of the definition of the pattern change rate. It is accordingly difficult to learn the relationship between the ablation image and the ablation volume. FIG. 3 is a diagram illustrating one example of the states of the processed portion of the processing object 10 and ablation images in the case of irradiation of the processed portion with pulse laser beam having a pulse width of 35 fs and a fluence of 0.46 J/cm as the processing laser beam (m−1) times, m times and (m+1) times. As illustrated, the processing of the processed part proceeds to change the irregularities on the surface of the processed portion (i.e., to change the ablation image) with an increase in number of irradiation pulses. Even at a fixed number of irradiation pulses, different fluences provide different processing degrees of the processed portion and provide different irregularities on the surface of the processed portion (i.e., provide different ablation images). By taking into account the foregoing, the relationship of the ablation image to the fluence and the number of irradiation pulses may be obtained by deep learning. The fluence and the number of irradiation pulses have correlations to the ablation volume. Reflecting the correlations of the fluence and the number of irradiation to the ablation volume on the relationship of the ablation image to the fluence and the number of irradiation pulses obtained by deep learning accordingly enables the ablation volume to be determined from the ablation image. According to the embodiment, the fluence F and the number of irradiation pulses n are specified as processing parameters, and the learning results 62 are obtained by reflecting the correlations of the processing parameters to the ablation volume on the relationship of the ablation image to the processing parameters.

Figure 4:
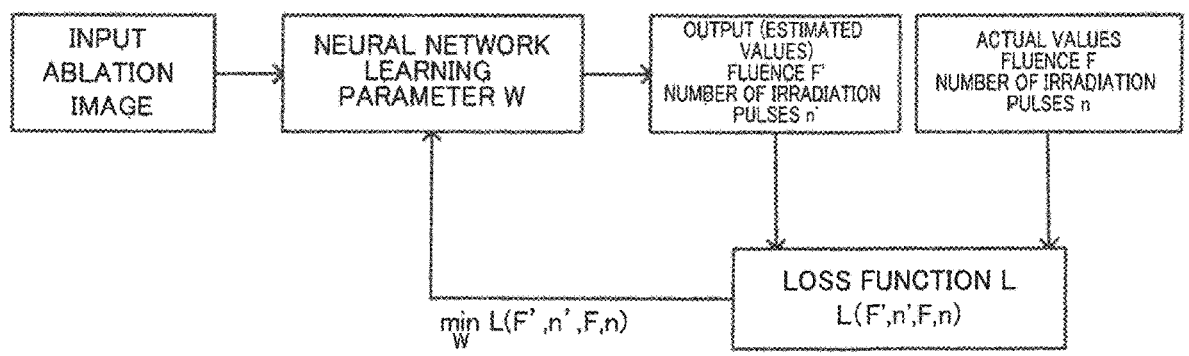
FIG. 4 is a diagram illustrating one example of deep learning used according to the embodiment.

FIG. 4 is a diagram illustrating one example of deep learning used according to the embodiment. Deep learning used according to the embodiment basically obtains the input of an ablation image (F, n) and estimates the fluence F' and the number of irradiation pulses n' as processing parameters by using a neural network having a learning parameter W as unknown. The deep learning subsequently calculates a loss based on the estimated fluence F' and number of irradiation pulses n' and the actual values of the fluence F and the number of irradiation pulses n and adjusts the learning parameter W to minimize the loss. A loss function employed to calculate the loss may be, for example, a mean square error between the estimated value and the actual value or a cross entropy of the estimated value and the actual value. According to the embodiment, however, in order to equalize the contributions of the fluence F and the number of irradiation pulses n as the processing parameters, the fluence F is converted into f(F) according to Expression (1) given below, and the number of irradiation pulses n is converted into g(n) according to Expression (2) given below. The loss is given as a mean square error between the converted f(F) and g(n) as shown by Expression (3) given below. In Expression (1), C1 denotes a constant, and $F_m$ in denotes a minimum fluence that is capable of performing the ablation processing. In Expression (2), C2 denotes a constant, and $n_{max}$ denotes a maximum value of the number of irradiation pulses in learning. These Expressions (1) and (2) are obtained as the result of the inventors' trial and error.

$$F \rightarrow f(F) = C1 \: \log(F/F_{min}) \quad (1)$$

$$n \rightarrow g(n) = C2\sqrt{n/n_{max}} \quad (2)$$

$$L = \frac{\sum [(\Delta f(F))^2 + (\Delta g(n))^2]}{N} \quad (3)$$

A procedure of the embodiment uses folding neural network, specifies three ablation images of three consecutive numbers of irradiation pulses with regard to each fluence as input data, and determines the learning parameter W by using hundred and fifty thousand (150000) input data according to the loss function of Expression (3).

Figure 5:
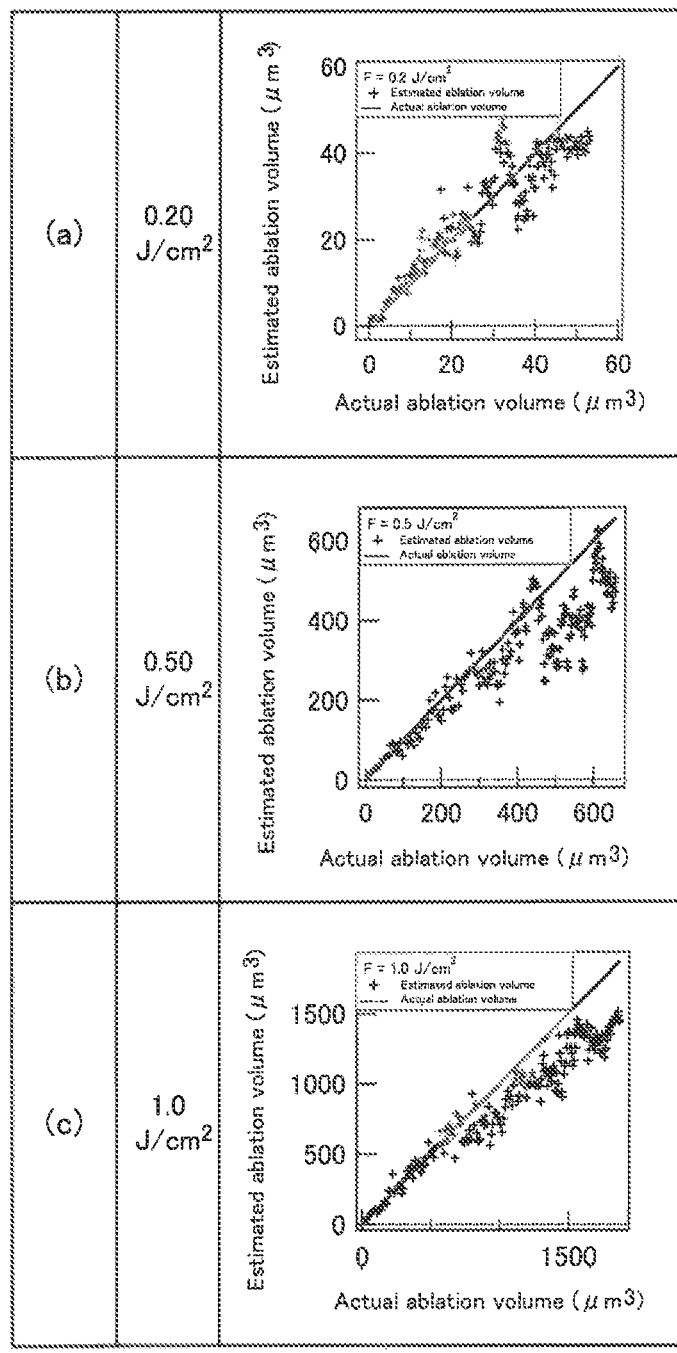
FIG. 5 is a diagram illustrating one example of relationships between an ablation volume estimated from learning results and an actual ablation volume with regard to different fluences.

FIG. 5 is a diagram illustrating one example of relationships between the ablation volume estimated from the learning results 62 and the actual ablation volume with regard to different fluences. In FIG. 5, an upper graph (a) shows the relationship at the fluence F of 0.20 J/cm$^2$, a middle graph (b) shows the relationship at the fluence F of 0.50 J/cm$^2$, and a lower graph (c) shows the relationship at the fluence F of 1.0 J/cm$^2$. In the graphs, 45-degree rightward rising straight lines indicate the actual ablation volumes. As illustrated, there are certain levels of variations in the relationship between the estimated ablation volume and the actual ablation volume. The estimated ablation volume tends to become smaller than the actual ablation volume with an increase in the fluence F and with an increase in the ablation volume. These graphs, however, show that the ablation volume is determinable from the learning results 62.

Figure 6:
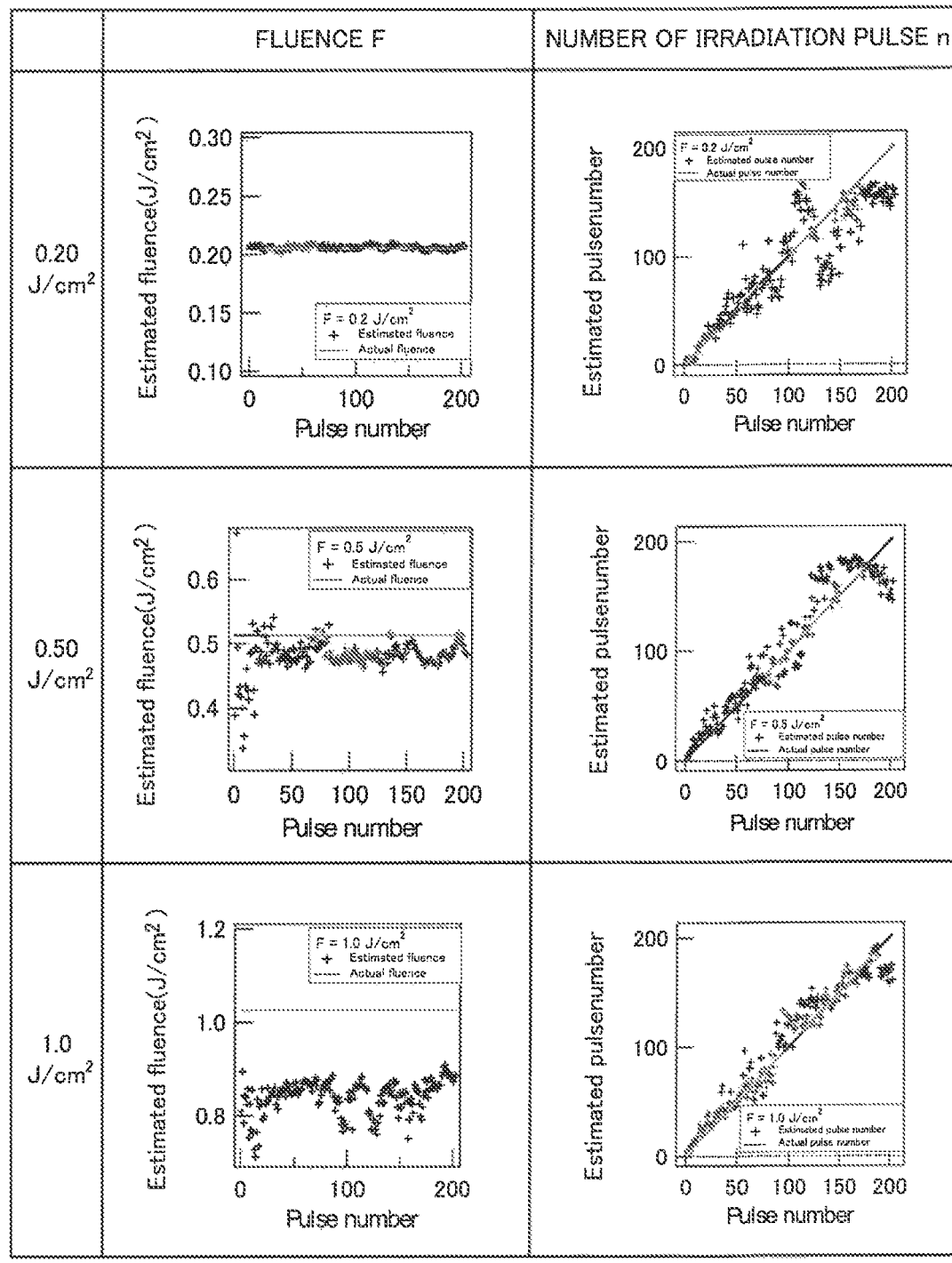
FIG. 6 is a diagram illustrating one example of estimated results with regard to new data of different fluences.

FIG. 6 is a diagram illustrating one example of estimated results with regard to new data of different fluences. In the graphs straight lines indicate the actual values. The estimated number of irradiation pulses is in the range of an error ratio of about 30%, irrespective of the fluence level. The estimated fluence, on the other hand, increases a difference from the actual fluence with an increase in fluence level. Similar estimated fluences are, however, provided at an identical actual fluence. These graphs also show that the ablation volume is determinable from the learning results 62, although a further increase in accuracy is desired by future research.

As described above, in the laser processing system 20 of the embodiment, the processed portion of the processing object 10 is irradiated with the processing laser beam output from the processing laser beam irradiator 32 and is subjected to ablation processing. The processed portion of the processing object 10 is, on the other hand, irradiated with the imaging laser beam that is output from the imaging laser beam irradiator 38 at the slightly later output timing than the output timing of the processing laser beam. An image of the irregularities on the surface of the processed portion is taken as an ablation image by the high-speed camera 50, based on the scattered light from the processed portion. The ablation volume is then determined by applying the taken ablation image to the learning results 62 by deep learning. The high-speed camera 50 takes the ablation image in an extremely short time. The system control device 60 determines the ablation volume in an extremely short time by applying the taken ablation image to the learning results 62 by deep learning. As a result, the ablation volume can be determined in an extremely short time during ablation processing by irradiation of the processing laser beam. The optimum value of the processing laser beam that is to be radiated next is determined by applying the determined ablation volume to the learning results 64 by reinforcement learning and is used to control the processing leaser beam irradiation device 30. This configuration optimizes laser processing of the processing object 10 by the processing laser beam irradiation device 30.

The laser processing system 20 of the embodiment uses the folding neural network, specifies the three ablation images of the three consecutive numbers of irradiation pulses with regard to each fluence as input data and employs the fluence F and the number of irradiation pulses n as the processing parameters and Expression (3) as the loss function. This provides the learning results 62 of the higher estimation accuracy by deep learning.

The laser processing system 20 of the embodiment uses the folding neural network. A modification may use a neural network without folding.

Figure 7:
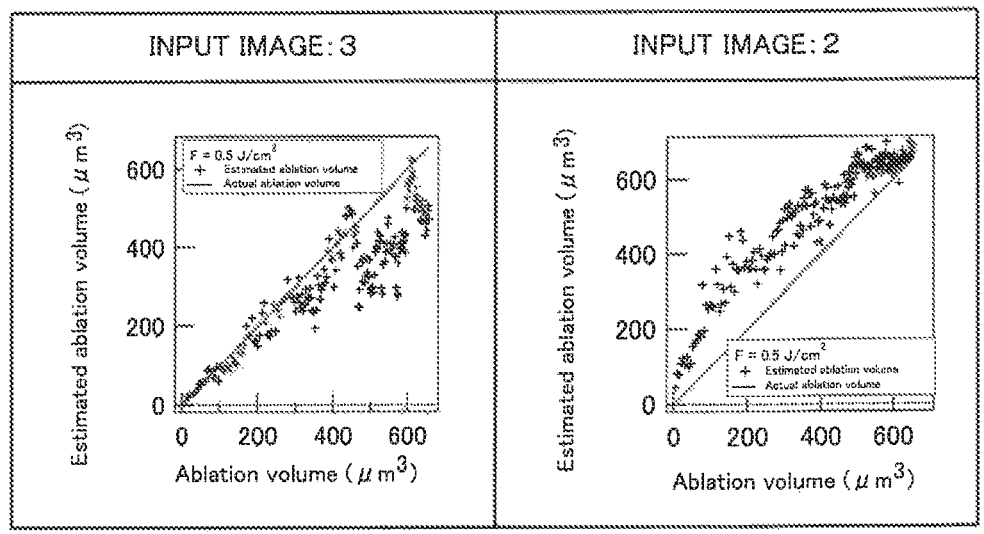
FIG. 7 is a diagram illustrating one example of learning results when three consecutive ablation images are used as input data and learning results when two consecutive ablation images are used as input data.

The laser processing system 20 of the embodiment specifies three ablation images of the three consecutive numbers of irradiation pulses with regard to each fluence, as input data. A modification may specify two ablation images of two consecutive numbers of irradiation pulses with regard to each fluence as input data, may specify four or more ablation images of four or more consecutive numbers of irradiation pulses with regard to each fluence as input data, or may specify an ablation image of each number of irradiation pulses with regard to each fluence as input data. As shown in FIG. 7, however, the configuration of using three consecutive ablation images as input data provides the learning results 62 of the higher estimation accuracy by deep learning, compared with a configuration of using two consecutive ablation images as input data.

The laser processing system 20 of the embodiment uses the fluence F and the number of irradiation pulses n as the processing parameters. The processing parameter may, however, be any parameter relating to the total energy of the processing laser beam which the processed portion is irradiated with since a start of the processing. The processing parameter used may be, for example, the light intensity of the processing laser beam and the sweep rate of the processing object, the fluence of the processing laser beam and the sweep rate of the processing object, the plasma emission intensity, or the sound pressure. Another modification may not use the processing parameters but may directly determine the relationship between the ablation image and the ablation volume.

The laser processing system 20 of the embodiment employs Expression (3) as the loss function. A modification may employ any other loss function as long as the loss function equalizes the contributions of the fluence and the number of irradiation pulses. When the processing parameters used are different parameters from the fluence and the number of irradiation pulses, the loss function used may be determined according to the characteristics of the parameters.

The laser processing system 20 of the embodiment uses the pulse laser as the processing laser beam. A modification may use continuously radiating laser beam for processing. In this modification, a control delay may occur for the processing by a time period required for determination of the ablation volume.

The laser processing system 20 of the embodiment takes an ablation image based on scattered light from the processing object 10 that is irradiated with the imaging laser beam from the imaging laser beam irradiator 38 configured to output the imaging laser beam having the wavelength of 633 nm and the pulse width of 500 μs. A modification may take an ablation image based on scattered light from the processing object 10 that is irradiated with laser beam from a laser beam irradiator configured to output the laser beam having a different wavelength from 633 nm and a different pulse width from 500 μs. For example, an ablation image may be taken based on scattered light from the processing object 10 that is irradiated with the processing laser beam from the processing laser beam irradiator 32. In this case, the imaging laser beam irradiator 38 is not required.

The laser processing system 20 of the embodiment employs the titanium sapphire laser beam irradiator that outputs the pulse laser beam having the wavelength of 800 nm, the pulse width of 35 fs, the repetition frequency of 1 KHz and the fluence of 0.1 to 1.0 J/cm$^2$. A modification may employ any laser beam irradiator configured to output the processing laser beam. The laser beam irradiator employed may be configured to output laser beam having a different wavelength from 800 nm, a different pulse width from 35 fs, a different repetition frequency from 1 KHz and a different fluence from of 0.1 to 1.0 J/cm$^2$.

The laser processing system 20 of the embodiment uses the learning results 64 by reinforcement learning. A modification may use results of any learning that achieves optimization.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The technique of the disclosure is preferably applicable to the manufacturing industries of the laser processing system and so on.

The invention claimed is:

1. A laser processing system equipped with a processing laser beam irradiation device configured to irradiate a processing object with a processing laser beam and perform ablation processing, the laser processing system comprising:
   a camera configured to obtain an ablation image of a processed portion of the processing object based on scattered light from the processed portion during processing of the processing object with the processing laser beam; and
   a processor programmed to estimate an ablation volume by inputting the ablation image into a deep learning model that specifies a relationship between the ablation image and the ablation volume and outputs the estimated ablation volume,
   wherein the deep learning model has been trained by outputting a processing parameter based on the input ablation image, and applying a loss function to the deep learning model based on actual values of the processing parameter, and the deep learning model estimates the ablation volume based on the processing parameter.

2. The laser processing system according to claim 1, wherein the deep learning is learning that uses a plurality of consecutive ablation images as input data in laser processing.

3. The laser processing system according to claim 1, wherein the processing parameter includes a parameter relating to a total energy of the processing laser beam which the processed portion is irradiated with since a start of the processing.

4. The laser processing system according to claim 1, further comprising:
   an imaging laser beam irradiation device configured to irradiate the processed portion with imaging laser beam that has a wavelength different from a wavelength of the processing laser beam, so as to obtain the ablation image.

5. The laser processing system according to claim 1, wherein the camera obtains the ablation image at a plurality of predetermined time intervals.

6. The laser processing system according to claim 5, wherein the processing laser beam irradiation device is configured to output a pulse laser beam having a pulse width of femtosecond order as the processing laser beam and perform ablation processing,
   the camera is configured to obtain the ablation image at every time of radiation of each pulse laser beam or a plurality of pulse laser beams, and
   the processor is programmed to estimate the ablation volume prior to radiation of next processing laser beam by the processing laser beam irradiation device.

7. The laser processing system according to claim 1, wherein the processing parameter is one of a plurality of processing parameters, and
   the plurality of processing parameters comprise (1) a fluence value, and (2) a number of irradiation pulses applied by the processing laser beam irradiation device.

* * * * *